(12) United States Patent
Fan et al.

(10) Patent No.: US 9,417,658 B2
(45) Date of Patent: Aug. 16, 2016

(54) ALL-IN-ONE COMPUTER AND SUPPORTING DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Yong-Chang Fan, Wuhan (CN); San-Yong Yang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 38 days.

(21) Appl. No.: 14/592,335

(22) Filed: Jan. 8, 2015

(65) Prior Publication Data

US 2016/0170442 A1     Jun. 16, 2016

(30) Foreign Application Priority Data

Dec. 12, 2014  (CN) .......................... 2014 1 0760526

(51) Int. Cl.
  *G06F 1/16*   (2006.01)
  *G06F 1/18*   (2006.01)
  *F16M 11/38*  (2006.01)

(52) U.S. Cl.
  CPC ................. *G06F 1/16* (2013.01); *F16M 11/38* (2013.01); *G06F 1/182* (2013.01)

(58) Field of Classification Search
  CPC ........................................................ G06F 1/16
  See application file for complete search history.

(56) References Cited

U.S. PATENT DOCUMENTS 6,282,082 B1 *  8/2001  Armitage .................. G06F 1/16
                                                312/223.2
6,856,506 B2 *  2/2005  Doherty ................ G06F 1/1632
                                                   16/329

* cited by examiner

*Primary Examiner* — Anthony Q Edwards
(74) *Attorney, Agent, or Firm* — ScienBiziP, P.C.

(57) ABSTRACT

An all-in-one computer includes a shell, a stand, and a plate. The stand and the plate are engaged with the shell. The stand includes at least one first supporting pole and a second supporting pole. The second supporting pole is configured to move relative to the at least one first supporting pole. The plate defines a plurality of grooves. An extending direction of the plurality of grooves is substantially parallel to each other. An end of the second supporting pole can engage with one of the plurality of grooves to support the shell.

20 Claims, 5 Drawing Sheets

ALL-IN-ONE COMPUTER AND SUPPORTING DEVICE

CROSS-REFERENCE TO RELATED APPLICATIONS

This application claims priority to Chinese Patent Application No. 201410760526.X filed on Dec. 12, 2014, the contents of which are incorporated by reference herein.

FIELD

The subject matter herein generally relates to an all-in-one computer.

BACKGROUND

An all-in-one computer combines a mainframe, a display, and a speaker in one unit. The all-in-one computer is widely used because of compact size and appearance.

BRIEF DESCRIPTION OF THE DRAWINGS

Implementations of the present technology will now be described, by way of example only, with reference to the attached figures.

DETAILED DESCRIPTION

Figure 1:
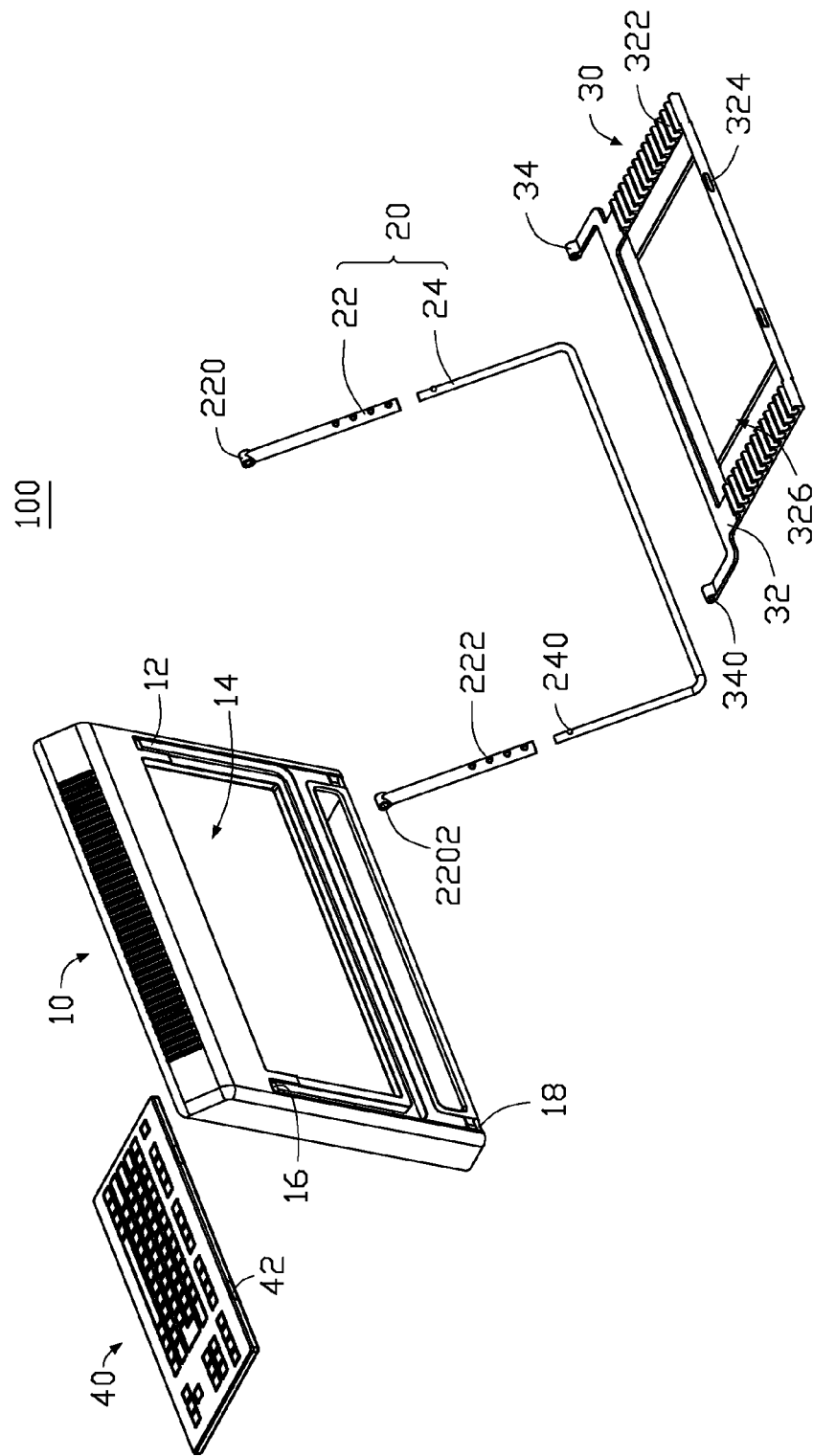
FIG. 1 is an exploded, isometric view of one embodiment of an all-in-one computer.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an all-in-one computer.

FIG. 1 illustrates one embodiment of an all-in-one computer 100. The all-in-one computer 100 includes a shell 10, a stand 20, a plate 30, and a keyboard 40.

The shell 10 defines a receiving groove 12 and a receiving space 14. The shell 10 includes two first connecting posts 16 and two second connecting posts 18. The two first connecting posts 16 are located on two ends of the receiving groove 12. The two second connecting posts 18 are located on an end of the shell 10 away from the two first connecting posts 16. In at least one embodiment, the receiving groove 12 can be substantially U-shaped. The receiving space 14 can be substantially rectangular. The receiving space 14 is surrounded by the receiving groove 12.

The stand 20 includes two first supporting poles 22 and a second supporting pole 24. Each first supporting pole 22 includes a first connecting portion 220 and defines a plurality of holes 222. The first connecting portion 220 defines a first connecting hole 2202. The second supporting pole 24 includes two protrusions 240. In at least one embodiment, the second supporting pole 24 can be substantially U-shaped. The two protrusions 240 are substantially elastic.

The plate 30 includes a body 32 and two second connecting portions 34. The two second connecting portions 34 extend from the body 32. The body 32 defines a plurality of grooves 322 and a space 326. The plurality of grooves 322 is located on two areas. The plurality of grooves 322 is substantially parallel to each other and is aligned in a direction towards the shell 10. The space 326 is located between the two areas. The body 32 includes two first magnetic members 324. Each second connecting portion 34 defines a second connecting hole 34. The keyboard 40 includes two second magnetic members 42. In at least one embodiment, the two first magnetic members 324 and the two second magnetic members 42 can be include magnets.

Figure 2:
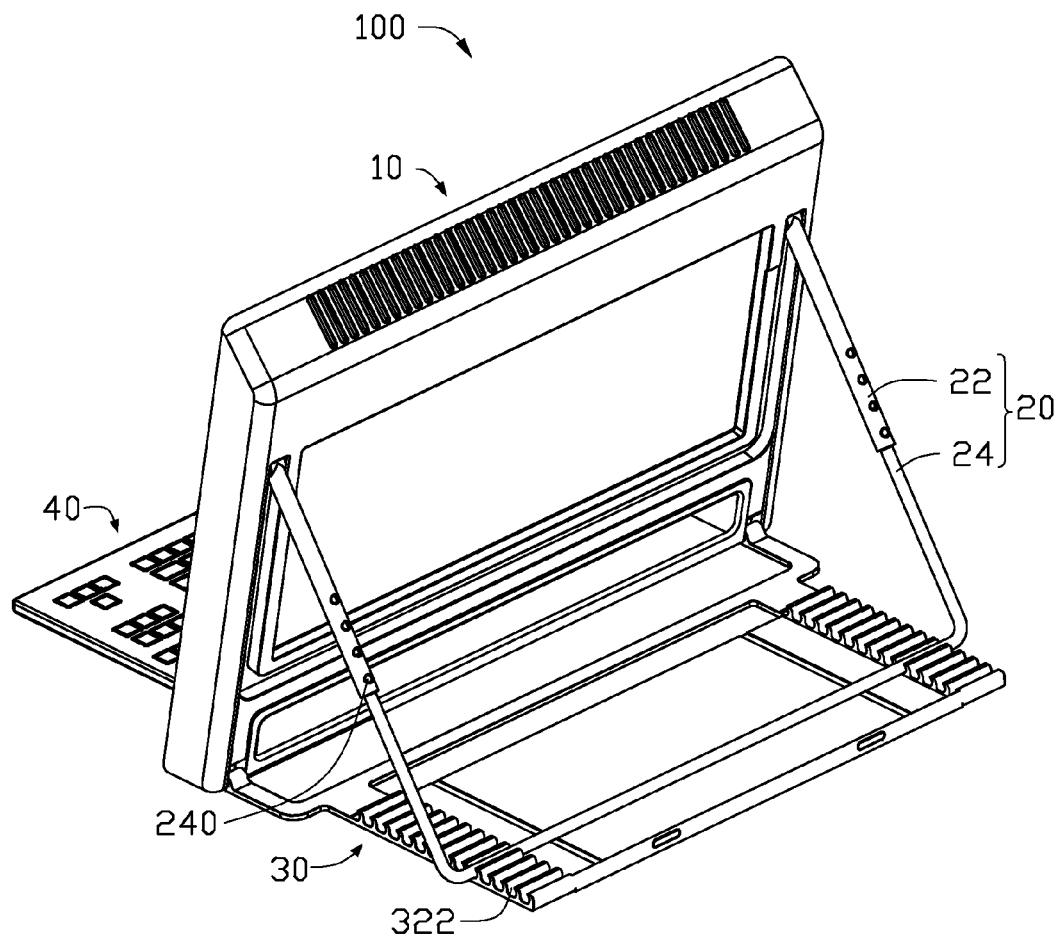
FIG. 2 is an assembled, isometric view of the all-in-one computer of FIG. 1, in a supporting state.
Figure 3:
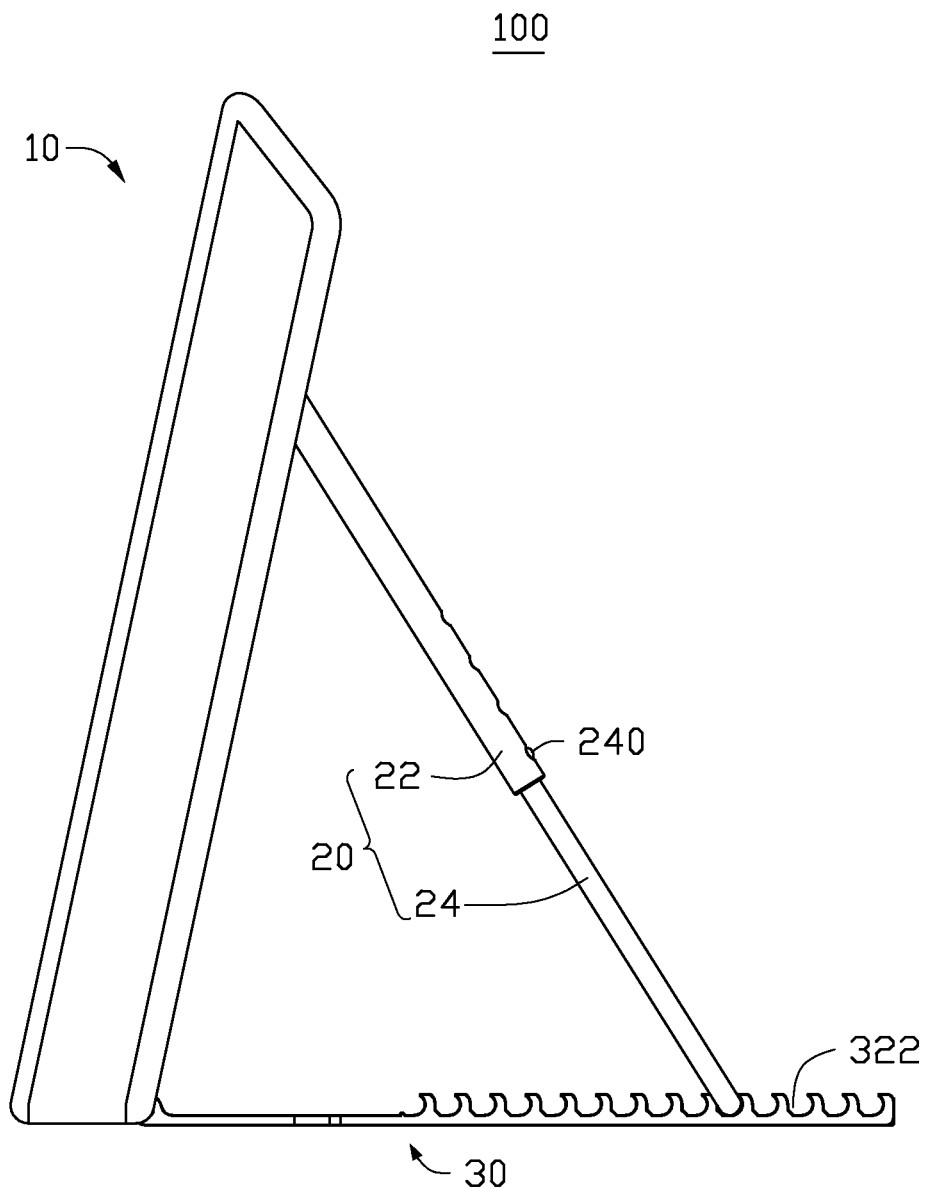
FIG. 3 is similar to FIG. 2, but viewed from another angle.
Figure 4:
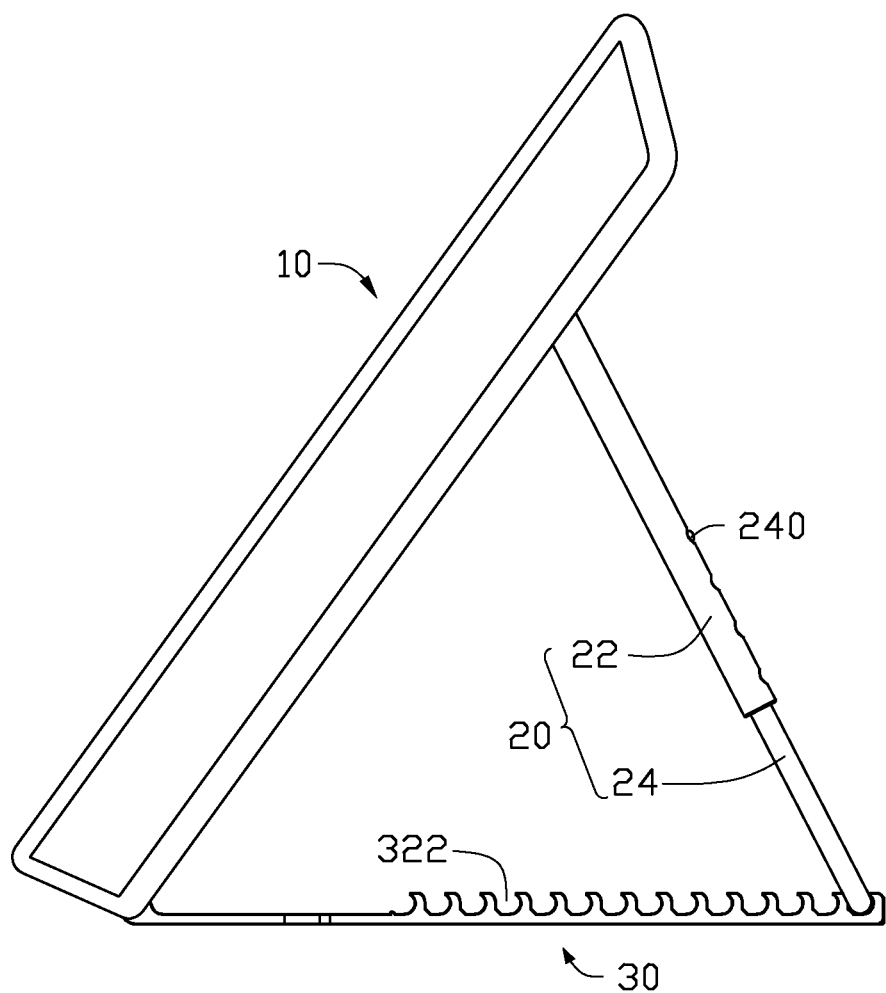
FIG. 4 is similar to FIG. 3, but in another supporting state.

FIG. 2-FIG. 4 illustrate an assembled view of the all-in-one computer 100. Each first connecting post 16 of the shell 10 is engaged with the each first connecting hole 2202 to secure the two first supporting poles 22 to the shell 10. (as shown in FIG. 1) The second supporting pole 24 is telescopic relative to the first supporting pole 22. The two protrusions 240 are respectively engaged with one of the plurality of holes 222 of each first supporting pole 22 to secure the two first supporting poles 22 to the second supporting pole 24. Each second connecting post 18 of the shell 10 is engaged with the each second connecting hole 340 to secure the plate 30 to the shell 10. (as shown in FIG. 1)

When the all-in-one computer 100 is in use, the plate 30 is placed on a plane; an end of the second supporting pole 24 is engaged with two of the plurality of grooves 322 to support the shell 10. When the all-in-one computer 100 is in a supporting state, the two first supporting poles 22 are substantially parallel to each other. An angle defined between the shell 10 and the plate 30 is substantially acute. When the all-in-one computer 100 transforms from the supporting state to another supporting state, the two protrusions 240 can be respectively engaged with the holes 222 at different heights to change a supporting length of the stand 20. The end of the second supporting pole 24 is engaged with other grooves 322 to adjust the angle between the shell 10 and the plate 30.

Figure 5:
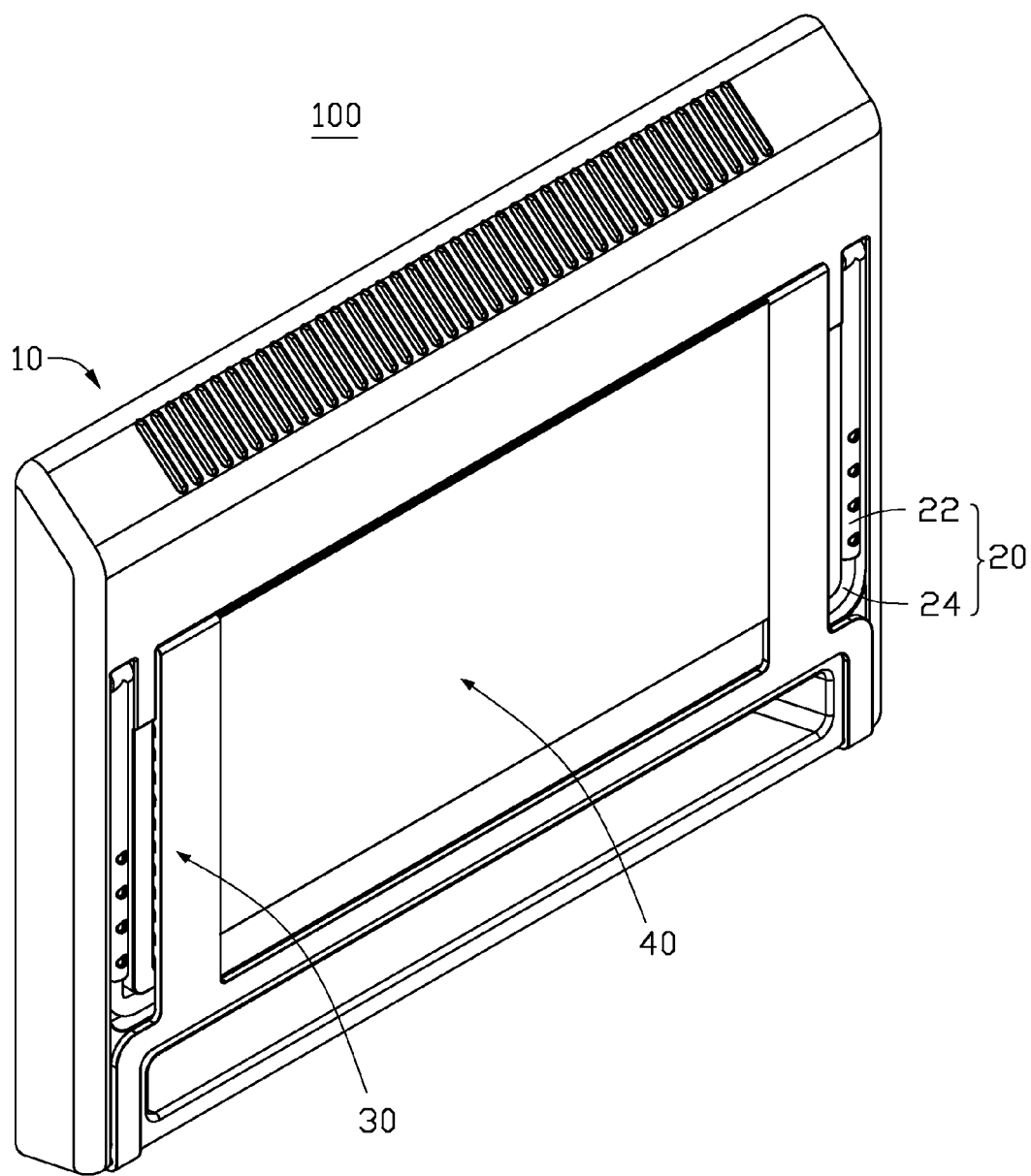
FIG. 5 is similar to FIG. 2, but in a closed state.

FIG. 5 illustrates the all-in-one computer 100 in a closed state. The keyboard 40 is engaged with the space 326 of the plate 30, the two first magnetic members 324 are engaged with the two second magnetic members 42 to prevent the keyboard 40 from moving relative to the plate 30. (as shown in FIG. 1) The stand 20 is received in the receiving groove 12 (as shown in FIG. 1). The keyboard 40 is received in the receiving space 14 of the shell 10. The plate 30 is partly received in the receiving space 14 of the shell 10 (as shown in FIG. 1).

The embodiments shown and described above are only examples. Many details are often found in the art such as the other features of an all-in-one computer. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An all-in-one computer comprising:
   a shell;
   a stand comprising at least one first supporting pole and a second supporting pole, the second supporting pole configured to move relative to the at least one first supporting pole; and
   a plate defining a plurality of grooves each of the plurality of grooves having an extending direction and an aligning direction, the extending direction of each of the plurality of grooves being substantially parallel to the extending direction of each of the other grooves, and the aligning direction of each of the plurality of grooves being towards the shell;
   wherein the stand and the plate are engaged with the shell, and an end of the second supporting pole is engaged with one of the plurality of grooves to support the shell.

2. The all-in-one computer of claim 1, wherein the at least one first supporting pole defines a plurality of holes, the second supporting pole comprises a protrusion, and the protrusion is engaged with one of the plurality of holes to secure the at least one first supporting pole to the second supporting pole.

3. The all-in-one computer of claim 1, wherein the second supporting pole is substantially U-shaped.

4. The all-in-one computer of claim 1, wherein the at least one first supporting pole comprises a first connecting portion, the first connecting portion defines a first connecting hole, the shell comprises at least one first connecting post, and the at least one first connecting post is engaged with the first connecting hole to secure the first supporting pole to the shell.

5. The all-in-one computer of claim 1, wherein the plate comprises at least one second connecting portion, the second connecting portion defines a second connecting hole, the shell comprises at least one second connecting post, and the at least one second connecting post is engaged with the second connecting hole to secure the plate to the shell.

6. The all-in-one computer of claim 1, further comprising a keyboard, the keyboard comprising at least one second magnetic member, wherein the plate comprises at least one first magnetic member and defines a space, the keyboard is configured to received in the space, and the at least one first magnetic member is engaged with the at least one second magnetic member to prevent the keyboard from moving away relative to the plate.

7. The all-in-one computer of claim 1, wherein the shell defines a receiving groove, and when the all-in-one computer is in a closed state, the stand is received in the receiving groove.

8. The all-in-one computer of claim 1, wherein the shell defines a receiving space, and when the all-in-one computer is in a closed state, the keyboard is received in the receiving space.

9. The all-in-one computer of claim 8, wherein when the all-in-one computer is in the closed state, the plate is partly received in the receiving space.

10. The all-in-one computer of claim 1, wherein when the stand supports the shell, and an angle defined between the shell and the plate is substantially acute.

11. A supporting device comprising:
    a stand comprising at least one first supporting pole and a second supporting pole, and the second supporting pole is configured to move relative to the at least one first supporting pole; and
    a plate defining a plurality of grooves each of the plurality of grooves having an extending direction and an aligning direction, the extending direction of each of the plurality of grooves being substantially parallel to the extending direction of each of the other grooves, and the aligning direction of each of the plurality of grooves being towards the shell;
    wherein the stand and the plate is engaged with the shell, an end of the second supporting pole being engaged with one of the plurality of grooves to support the shell.

12. The supporting device of claim 11, wherein the at least one first supporting pole defines a plurality of holes, the second supporting pole comprises a protrusion, and the protrusion is engaged with one of the plurality of holes to secure the at least one first supporting pole to the second supporting pole.

13. The supporting device of claim 11, wherein the second supporting pole is substantially U-shaped.

14. The supporting device of claim 11, wherein the at least one first supporting pole comprises a first connecting portion, the first connecting portion defines a first connecting hole, the shell comprises at least one first connecting post, and the at least one first connecting post is engaged with the first connecting hole to secure the first supporting pole to the shell.

15. The supporting device of claim 11, wherein the plate comprises at least one second connecting portion, the second connecting portion defines a second connecting hole, the shell comprises at least one second connecting post, and the at least one second connecting post is engaged with the second connecting hole to secure the plate to the shell.

16. The supporting device of claim 11, further comprising a keyboard, the keyboard comprising at least one second magnetic member, wherein the plate comprises at least one first magnetic member and defines a space, the keyboard is configured to received in the space, and the at least one first magnetic member is engaged with the at least one second magnetic member to prevent the keyboard from moving away relative to the plate.

17. The supporting device of claim 11, wherein the shell defines a receiving groove, and when an all-in-one computer is in a closed state, the stand is received in the receiving groove.

18. The supporting device of claim 11, wherein the shell defines a receiving space, and when an all-in-one computer is in a closed state, the keyboard is received in the receiving space.

19. The supporting device of claim 18, wherein when the all-in-one computer is in the closed state, the plate is partly received in the receiving space.

20. The supporting device of claim 11, wherein when the stand supports the shell, an angle between the shell and the plate is acute.

* * * * *